United States Patent
Yanagisawa

(10) Patent No.: US 8,027,831 B2
(45) Date of Patent: Sep. 27, 2011

(54) INFORMATION DISPLAY CONTROL APPARATUS AND RECORDING MEDIUM RECORDING INFORMATION DISPLAY CONTROL PROGRAM

(75) Inventor: Masaaki Yanagisawa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1218 days.

(21) Appl. No.: 11/729,272

(22) Filed: Mar. 27, 2007

(65) Prior Publication Data

US 2007/0260451 A1    Nov. 8, 2007

(30) Foreign Application Priority Data

Mar. 27, 2006   (JP) ................................. 2006-085522

(51) Int. Cl.
    *G06F 17/20*   (2006.01)
(52) U.S. Cl. ....... 704/8; 704/1; 704/9; 704/10; 707/706; 707/707; 707/708; 715/259; 715/264
(58) Field of Classification Search .................. 704/1, 8, 704/9, 10; 715/259, 264; 707/706–708
    See application file for complete search history.

(56) References Cited

U.S. PATENT DOCUMENTS

| | | | | |
|---|---|---|---|---|
| 5,065,318 | A * | 11/1991 | Kugimiya et al. ................. | 704/6 |
| 5,225,981 | A * | 7/1993 | Yokogawa ......................... | 704/2 |
| 5,644,774 | A | 7/1997 | Fukumochi et al. | |
| 5,885,081 | A * | 3/1999 | Tamura et al. ................. | 434/169 |
| 6,173,251 | B1 * | 1/2001 | Ito et al. ............................ | 704/7 |
| 6,393,399 | B1 * | 5/2002 | Even ............................. | 704/257 |
| 6,735,559 | B1 * | 5/2004 | Takazawa ........................ | 704/7 |
| 7,680,649 | B2 * | 3/2010 | Park ................................ | 704/10 |
| 7,720,847 | B2 * | 5/2010 | Driessen et al. ............... | 707/736 |
| 2004/0267537 | A1 * | 12/2004 | Nakamura et al. ............ | 704/276 |
| 2005/0091030 | A1 * | 4/2005 | Jessee et al. ....................... | 704/4 |

(Continued)

FOREIGN PATENT DOCUMENTS

JP    03210659 A  *  9/1991

(Continued)

OTHER PUBLICATIONS

Anonymous: "Canon IDF-3000 Electronic Dictionary. English Instruction Manual", Internet Citation, [Online] Mar. 2000, XP002310404, Retrieved from the Internet: URL:http://www.worktankcentral.com/manuals.php> [retrieved on Dec. 13, 2004], p. 14.

(Continued)

*Primary Examiner* — David R Hudspeth
*Assistant Examiner* — Lamont Spooner
(74) *Attorney, Agent, or Firm* — Holtz, Holtz, Goodman & Chick, P.C.

(57) ABSTRACT

An information display control apparatus includes an example sentence storage unit that stores a plurality of example sentences, an input unit that accepts a user's operation of inputting a string of characters, an example sentence search unit that, when a compound word consisting of a plurality of constituting words which are combinable and splittable is input via the input unit, searches the example sentences in the example sentence storage unit for an example sentence containing the compound word in a combined state where the plurality of constituting words are combined and an example sentence containing the compound word in a split state where the plurality of constituting words are split, and a display control unit that displays the example sentences searched by the example sentence search unit.

5 Claims, 10 Drawing Sheets

U.S. PATENT DOCUMENTS

| | | | |
|---|---|---|---|
| 2005/0197829 A1* | 9/2005 | Okumura | 704/10 |
| 2005/0228639 A1* | 10/2005 | Abe et al. | 704/7 |
| 2005/0251384 A1* | 11/2005 | Yang | 704/10 |

FOREIGN PATENT DOCUMENTS

| | | |
|---|---|---|
| JP | 2000-276479 A | 10/2000 |
| JP | 2004-206538 A | 7/2004 |
| JP | 2004-206552 A | 7/2004 |
| JP | 2004-213342 A | 7/2004 |
| WO | WO 2004/059461 A | 7/2004 |

OTHER PUBLICATIONS

Ten Hacken, Stephan Bopp: "Separable Verbs in a Reusable Morphological Dictionary for German", Coling 1998: The 17th International Conference on Computational Liguistics, [Online], vol. 1, 1998, pp. 471-475, XP002446852, Retrieved from the Internet: URL:http://ucrel.lancs.ac.uk/acl/C/C98/C98-1075.pdf> [retrieved on Aug. 14, 2007], Abstract, paragraph [0001]—paragraph [0002], pp. 472, left-hand column.

Anonymous: "Canon IDF-4100 Electronic Dictionary Instruction Manual", Internet Citation, [Online] Nov. 2002, XP002310405, Retrieved from the Internet: URL:http//www.jbox.com/STUDYAIDS/STWT_1.HTML> [retrieved on Dec. 13, 2004]—p. 21

Japanese Office Action dated Mar. 30, 2010 and English translation thereof in counterpart Japanese Application No. 2006-085522.

Japanese Office Action dated Jul. 20, 2010 and English translation thereof, issued in counterpart Japanese Application No. 2006-085522.

* cited by examiner

FIG. 3

| ENTRY WORD | EXPLANATION DATA | EXAMPLE SENTENCE IDENTIFICATION INFORMATION |
|---|---|---|
| ⋮ | ⋮ | ⋮ |
| ab | 副)離れて、なくなって、… | 00191,… |
| gehen | 動)歩く、行く、… | 00500,… |
| abgehen | 動)立ち去る、離れる、… | 00700,… |
| ⋮ | ⋮ | ⋮ |

| EXAMPLE SENTENCE IDENTIFICATION INFORMATION | EXAMPLE SENTENCE | TRANSLATION | COMPOUND WORD | | ... | |
|---|---|---|---|---|---|---|
| | | | SPLIT VERB 1 | SPLIT VERB 2 | ... | |
| 1255 | von der Bühne abgehen | (俳優が)舞台を去る、引退する | ab \|gehen | — | ... | ⎫ |
| 1256 | in die Ewigkeit abgehen | 永遠の眠りにつく. | ab \|gehen | — | ... | ⎬ R1 |
| 1265 | reiβend abgehen | 飛ぶように売れる. | ab \|gehen | — | ... | ⎪ |
| 1266 | von seinen Entschluss abgehen | 決心を変える(捨てる) | ab \|gehen | — | ... | ⎪ |
| 1290 | von der Wahrheit abgehen | 真実を曲げる. | ab \|gehen | — | ... | ⎪ |
| 1291 | einer Wind abgehen <話: fahren > lassen | 放屁(ほうひ)する | ab \|gehen | — | ... | ⎭ |
| ... | ... | ... | ... | ... | ... | |
| 123 | Der Schauspieler geht nach links ab. | 左手(下手)に退出する. | ab \|gehen | — | ... | ⎫ |
| 124 | Ihm geht die Erfahrung ab. | 彼には経験が足りない. | ab \|gehen | — | ... | ⎪ |
| 135 | Es geht mit ihm auf und ab. | 彼の境遇(容態)はよくなったり悪くなったりする. | — | — | ... | ⎬ R2 |
| 136 | Ab [geht] die Post! | (話)いすぐ(出かけるぞ::ⅱ)とっと行け. | — | — | ... | ⎪ |
| 137 | Das Buch findet (hat) reibenden Absatz./Das Buch geht | その本は飛ぶように売れる. | ab \|gehen | — | ... | ⎭ |
| ... | ... | ... | ... | ... | ... | |
| 1250 | Bei Barzahlung gehen 5 Prozent ab. | 現金払いなら5パーセント割引になります. | ab \|gehen | — | ... | } R3 |
| ... | ... | ... | ... | ... | ... | |
| 1271 | An meiner Jacke ist ein Knopf abgegangen. | 私の上着のボタンが一つ取れた. | ab \|gehen | — | ... | ⎫ R4 |
| 1270 | Alles ist gut abgegangen. | すべてうまくいった. | ab \|gehen | — | ... | ⎭ |

| ENTRY WORD | EXAMPLE SENTENCE IDENTIFICATION INFORMATION |
|---|---|
| ⋮ | ⋮ |
| ab | 00191, ⋯ |
| gehen | 00500, ⋯ |
| abgehen | 00700, ⋯ |
| ⋮ | ⋮ |

| VERB | |
|---|---|
| ⋮ | ⋮ |
| kommen | komme |
| | kommst |
| | kommt |
| | kam |
| | gekommen |
| ⋮ | ⋮ |

602

| ADJECTIVE | |
|---|---|
| ⋮ | ⋮ |
| gut | guter |
| | guten |
| | gutem |
| | gutes |
| | gute |
| | gutest |
| ⋮ | ⋮ |

601

| NOUN | |
|---|---|
| ⋮ | ⋮ |
| name | des names |
| | die namen |
| ⋮ | ⋮ |

603

| PRONOUN | |
|---|---|
| ⋮ | ⋮ |
| ich | meiner |
| | mir |
| | mich |
| ⋮ | ⋮ |

FIG. 10

```
┌─────────────────────────────────────────────┐
│         ≡GERMAN-JAPANESE DICTIONARY≡        │
├─────────────────────────────────────────────┤
│ [A]  ¶ Es geht mit ihm auf und ab.          │
│ [B]  ¶ Ab [geht] die Post!                  │
│                                             │
│                                             │
│                                             │
├─────────────────────────────────────────────┤
│ 【auf】                                      │
│ ¶ Es geht mit ihm auf und ab                │
│    彼の境遇(容態)はよくなったり悪くなったりする    │
└─────────────────────────────────────────────┘
```

FIG. 11A

| ≡GERMAN-JAPANESE DICTIONARY≡ |
|---|
| SPELL?  　SEARCH BY ENTRY WORD 【　　　　　　　　　　】  　SEARCH BY IDIOM　　　　【　　　　　　　　　　】  　▨SEARCH BY EXAMPLE▨　【 abgehen_　　　　　】 |
| GERMAN-JAPANESE DICTIONARY |
| SEARCH FOR EXAMPLE SENTENCE  INPUT WORD(S) IN EXAMPLE SENTENCE TO BE CHECKED, AND PRESS TRANSLATE/SET PLACE & BETWEEN WORDS |

FIG. 11B

| ≡GERMAN-JAPANESE DICTIONARY≡ |
|---|
| SPELL?  　　▨SEARCH BY EXAMPLE▨　【ab|gehen　　　　　　】 |
| GERMAN-JAPANESE DICTIONARY |
| SEARCH FOR EXAMPLE SENTENCE  INPUT WORD(S) IN EXAMPLE SENTENCE TO BE CHECKED, AND PRESS TRANSLATE/SET PLACE & BETWEEN WORDS |

FIG. 12

| GERMAN-JAPANESE DICTIONARY |
|---|

| | |
|---|---|
| [A] | ¶ von der Bühne abgehen |
| [B] | ¶ in die Ewigkeit abgehen |
| [C] | ¶ reißend abgehen |
| [D] | ¶ von seinem Entschluss abgehen |
| [E] | ¶ von der Wahrheit abgehen |
| [F] | ¶ einen Wind abgehen < 話 : fahren > lassen |
| [G] | ¶ Der Schauspieler geht nach links ab. |
| [H] | ¶ Ihm geht die Erfahrung ab. |
| [H] | ¶ Das Buch findet (hat) reißenden Absatz. /Das Buch geht |
| [I] | ¶ Bei Barzahlung gehen 5 Prozent ab. |
| [J] | ¶ An meiner Jacke ist ein Knopf abgegangen. |
| [K] | ¶ Alles ist gut abgegangen. |

【ab|ge hen】
 ¶ von der Bühne abgehen
　　(俳優が)舞台を去る、引退する

INFORMATION DISPLAY CONTROL APPARATUS AND RECORDING MEDIUM RECORDING INFORMATION DISPLAY CONTROL PROGRAM

BACKGROUND OF THE INVENTION

1. Field of the Invention

The present invention relates to an information display control apparatus having an example sentence search capability and a recording medium recording an information display control program.

2. Description of the Related Art

There is an information display control apparatus called an electronic dictionary in which several kinds of dictionary databases, such as various dictionaries like a Japanese dictionary, a Japanese-English dictionary, and an English-Japanese dictionary, various glossaries, and an encyclopedia, are installed. This information display control apparatus searches the dictionary databases for entry words corresponding to an input search word and displays meanings or the like of the entry words, and searches the dictionary databases for an example sentence using the input search word and displays a list of the searched example sentences.

There is a technique which relates to such an information display control apparatus and properly displays explanation information of a plurality of words forming a compound word when the compound word is designated as a search word (see, for example, Unexamined Japanese Patent Application KOKAI Publication No. 2004-206538). According to the technique, when a compound word (split verb) [abgehen] which is the combination of, for example, German words [ab] and [gehen] is designated as a search word, explanation information on each constituting word [ab], [gehen] is displayed.

However, such a compound word may be used in a sentence with the constituting words combined (hereinafter referred to as "combined state") or may be used in a sentence with the constituting words separated or split (hereinafter referred to as "split state"). Therefore, the information display control apparatus disclosed in Unexamined Japanese Patent Application KOKAI Publication No. 2004-206538 does not search for an example sentence containing a compound word in a split state (e.g., [Bei Barzahlung gehen 5 prozent ab.]) when a search for an example sentence is performed with a compound word in a combined state (e.g., [abgehen]) being designated as a search word, and does not search for an example sentence containing a compound word in a combined state (e.g., [in die Ewigkeit abgehen]) when a search for an example sentence is performed with a compound word in a split state (e.g., [ab & gehen]) being designated as a search word.

SUMMARY OF THE INVENTION

Accordingly, it is an object of the present invention to provide an information display control apparatus and program capable of searching for an adequate example sentence when the example sentence contains a compound word or the like.

An information display control apparatus (e.g., electronic dictionary 1 in FIG. 1) according to the invention includes:

an example sentence storage unit (e.g., flash ROM 5 in FIG. 2) that stores a plurality of example sentences;

an input unit (e.g., input unit 30 in FIG. 2; step S1 in FIG. 7) that accepts a user's operation of inputting a string of characters;

an example sentence search unit (e.g., CPU 4 and information display control program 51 in FIG. 2; step S12 and step S14 in FIG. 7) that, when a compound word (e.g., German split verb [abgehen]) consisting of a plurality of constituting words which are combinable and splittable is input via the input unit, searches the example sentences in the example sentence storage unit for an example sentence containing the compound word (e.g., [abgehen]) in a combined state where the plurality of constituting words are combined and an example sentence containing the compound word (e.g., [gehen . . . ab]) in a split state where the plurality of constituting words are split; and a display control unit (e.g., CPU 4 and information display control program 51 in FIG. 2; step S15 in FIG. 7) that displays the example sentences searched by the example sentence search unit.

According to the invention, when a compound word consisting of a plurality of constituting words which are combinable and splittable is input, example sentences each containing the compound word in a combined state where the plurality of constituting words are combined and example sentences each containing the compound word in a split state where the plurality of constituting words are split are retrieved. Even when a compound word in a combined state is input or a compound word in a split state is input, therefore, example sentences each containing a compound word in a combined state and example sentences each containing a compound word in a split state are retrieved. Unlike the conventional technique, therefore, it is possible to search for an adequate example sentence.

BRIEF DESCRIPTION OF THE DRAWINGS

These objects and other objects and advantages of the present invention will become more apparent upon reading of the following detailed description and the accompanying drawings in which:

FIG. 3 is a diagram for explaining the structure of an entry-word data table;

FIG. 4 is a diagram for explaining the structure of an example-sentence data table;

FIG. 5 is a diagram for explaining the structure of a word-example-sentence data table;

FIG. 6 is a diagram for explaining the structure of a changing-form-word data table;

FIG. 10 is a diagram showing search results when example sentences are searched from the state in FIG. 9;

FIG. 11A is a diagram showing a state where a compound word is input in a compound-word designated combined form;

FIG. 11B is a diagram showing a state where a compound word is input in a compound-word designated splitting form; and FIG. 12 is a diagram showing search results when example sentences are searched from the states in FIGS. 11A and 11B.

DETAILED DESCRIPTION OF THE PREFERRED EMBODIMENT

An embodiment which has an information display control apparatus according to the present invention adapted to a foldable portable electronic dictionary (hereinafter simply "electronic dictionary") will be described in detail below with reference to FIGS. 1 to 12.

To begin with, the structure of an electronic dictionary will be described.

[External Configuration]

Figure 1A:
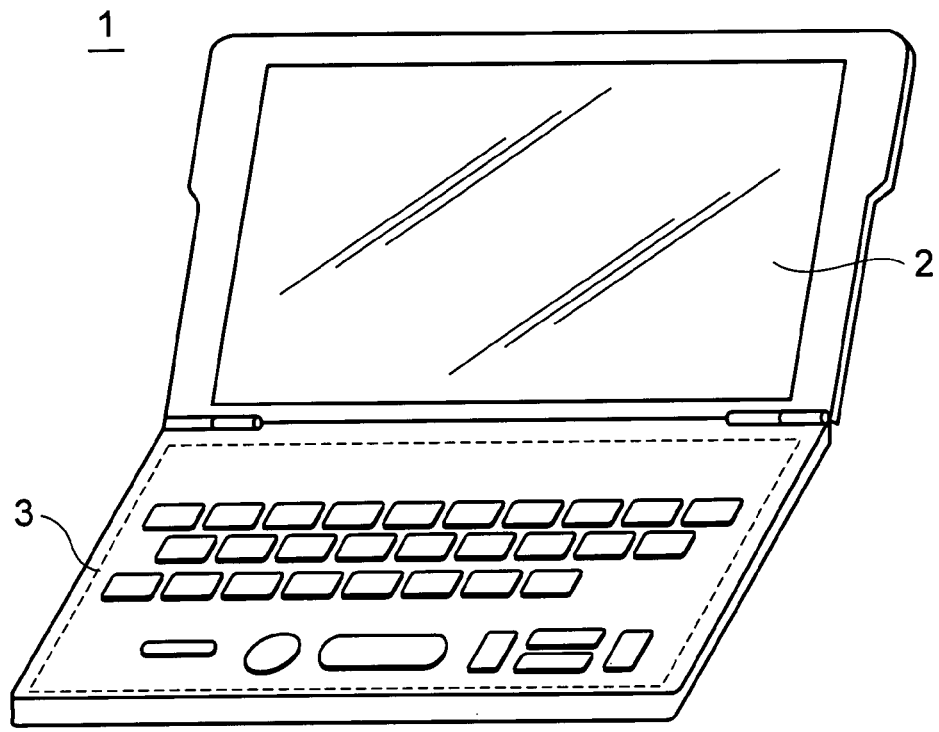
FIG. 1A is a perspective view of an electronic dictionary to which an information display control apparatus according to the present invention is adapted.

FIG. 1A is a perspective view of an electronic dictionary 1.

As shown in FIG. 1, the electronic dictionary 1 includes a display 2 and various keys 3.

The display 2 displays various kinds of data, such as characters and symbols, according to the operation of the keys 3 by a user. The display 2 is constituted by an LCD (Liquid Crystal Display), an ELD (Electronic Luminescent Display) or the like.

Figure 1B:
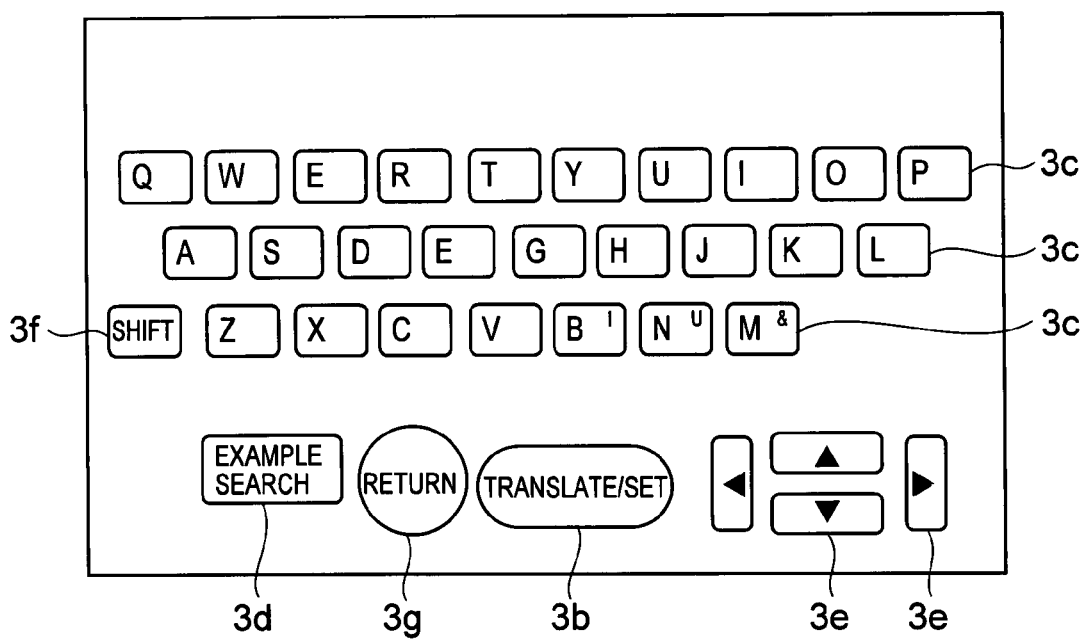
FIG. 1B is a partly plan view of the electronic dictionary to which the information display control apparatus according to the invention is adapted.

The keys 3 include various keys for the user to operate the electronic dictionary 1. Specifically, as shown in FIG. 1B, the keys 3 include a TRANSLATE/SET key 3b, a SHIFT key 3f, character keys 3c, a EXAMPLE SEARCH key 3d, a cursor keys 3e and a RETURN key 3g.

The TRANSLATE/SET key 3b is used to execute a search and set an entry word. The SHIFT key 3f is used to set a Japanese word as a search target. The character keys 3c are used for the user to input characters, for example, and include "A" to "Z" keys in the embodiment. In a case where the character keys 3c are operated after operation of the SHIFT key 3f, a split line [|] of a compound word is input by the "B" key, space is input by the "N" key, and an AND symbol [&] is input by the "M" key.

The EXAMPLE SEARCH key 3d is used to search for an example sentence containing a designated word and display the example sentence. The cursor keys 3e is used to move or so the highlighted position or the cursor position in the screen. The RETURN key 3g is used to return the screen to the previously displayed screen.

[Internal Configuration]

Figure 2:
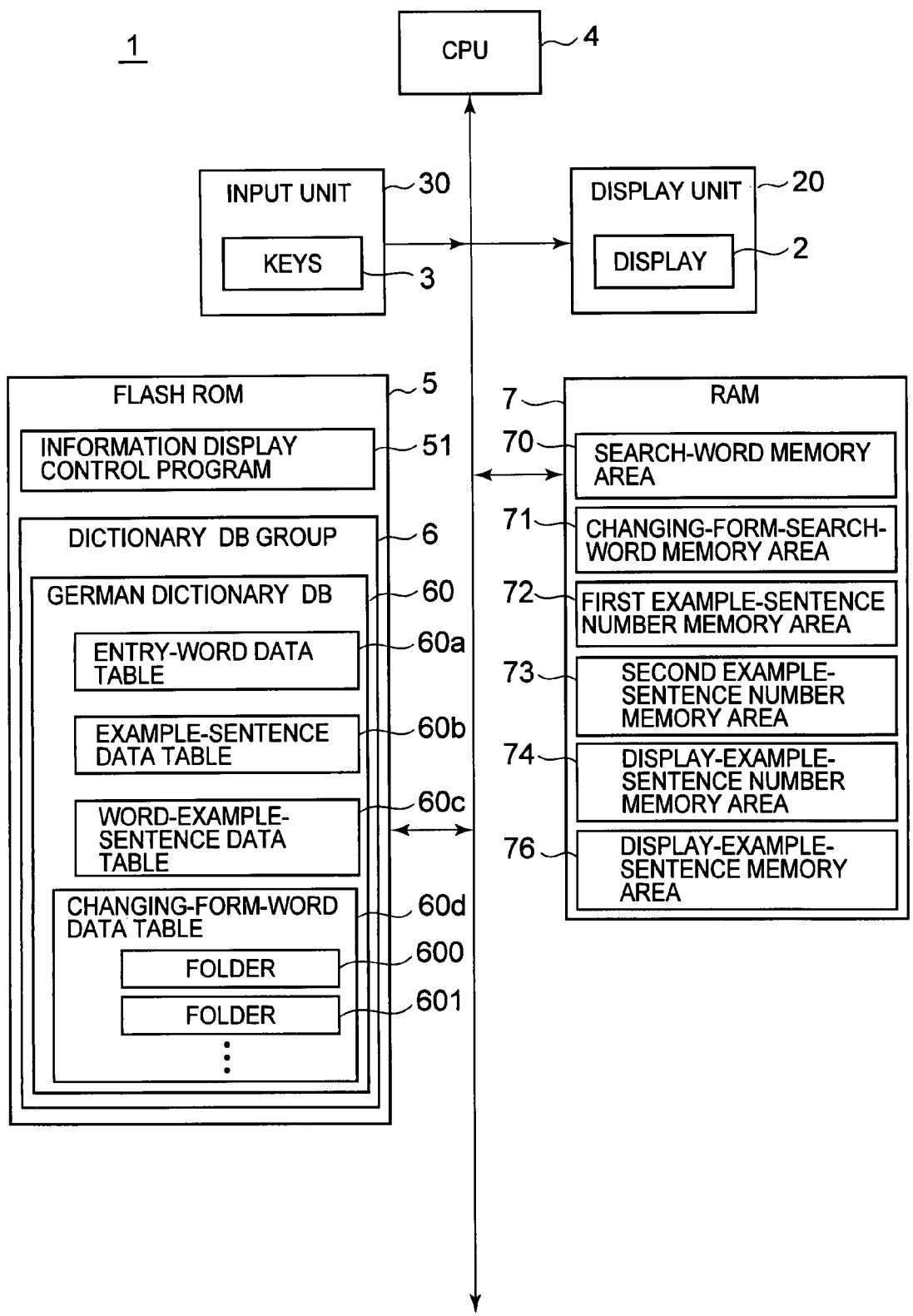
FIG. 2 is a block diagram of the electronic dictionary to which the information display control apparatus according to the invention is adapted.

FIG. 2 is a block diagram showing the schematic configuration of the electronic dictionary 1.

As shown in FIG. 2, the electronic dictionary 1 includes a display unit 20, an input unit 30, a CPU 4 a flash ROM 5 and an RAM 7.

The display unit 20 has the display 2, and displays various kinds of information on the display 2 based on a display signal input from the CPU 4.

The input unit 30 has the keys 3, and outputs a signal corresponding to a depressed key to the CPU 4.

In response to an input instruction, the CPU 4 executes a process based on a predetermined program to, for example, given an instruction to the individual function sections and transfer data. The CPU 4 performs the general control of the electronic dictionary 1. Specifically, according to an operation signal or the like input from the input unit 30, the CPU 4 reads various programs stored in the flash ROM 5 and executes processes according to the programs. The CPU 4 stores process results in the RAM 7, and sends a display signal for displaying the process result to the display unit 20 whenever necessary to display corresponding display contents.

The flash ROM 5 stores programs and data for achieving the various functions of the electronic dictionary 1. In the embodiment, the flash ROM 5 stores an information display control program 51 according to the invention and a dictionary database group 6.

The information display control program 51 allows the CPU 4 to execute an example sentence search (FIG. 7) to be described later.

The dictionary database group 6 includes various dictionary databases like a Japanese dictionary, an English-Japanese dictionary, and a Japanese-English dictionary. In the embodiment, the dictionary database group 6 includes a German dictionary database 60.

The German dictionary database 60 has an entry-word data table 60a, an example-sentence data table 60b, a word-example-sentence data table 60c, and a changing-form-word data table 60d.

As shown in FIG. 3, an entry word (e.g., "ab"), explanation data ("adv.") away, gone, . . . ") indicating the meaning the entry word and example sentence identification information (e.g., "00191, . . . ") designating an example sentence to be displayed together with the explanation data are stored in the entry-word data table 60a in association with one another. The "example sentence identification information" is information to identify an example sentence to be stored in the example-sentence data table 60b, and is an example sentence number in the embodiment.

As shown in FIG. 4, example sentence identification information (e.g., "1256"), an example sentence (e.g., [in die Ewigkeit abgehe]) corresponding to the example sentence identification information, a translation of the example sentence (e.g., [永遠の眠りにつく]; which means "sleep permanently"), and the type of a compound word (e.g., [ab|gehen]), such as a split verb contained in the example sentence are stored in the example-sentence data table 60b in association with one another. FIG. 4 shows information about an example sentence containing a compound word [abgehen] in a combined state in an example sentence field R1, information about an example sentence containing a word [ab] and a word [geht] in an example sentence field R2, information about an example sentence containing a word ["gehen] and a word [ab] in an example sentence field R3, information about an example sentence containing a compound word [abgegangen] in a combined state in an example sentence field R4. A split line [|] is shown between constituting words which form a compound word in the compound word field on the right-hand side in FIG. 4. For an example sentence which does not contain a compound word therein, a slash symbol [-] gives an indication to that effect.

As shown in FIG. 5, a word (e.g., [ab]) and example sentence identification information (e.g., "00191, . . . ") on all example sentences containing the word are stored in the word-example-sentence data table 60c in association with each other. That is, example sentence identification information of an example sentence which is displayed together with explanation data of a corresponding entry word as well as example sentence identification information of example sentences which are displayed together with explanation data of other entry words are stored in the word-example-sentence data table 60c.

As shown in FIG. 2, the changing-form-word data table 60d has a plurality of folders 600, 601 and so forth classified according to parts of speech. Each folder 600, 601, . . . stores changing forms corresponding to a root word.

Specifically, as shown in FIG. 6, the folder 600 stores changing forms corresponding to vernal words, e.g., a declension, a past form, a past participle form and so forth. When the root word of a verb is ⌈kommen⌋, for example, all the changing forms ⌈komme, kommst, kommt, kam, gekommen⌋, etc. corresponding to ⌈kommen⌋ are stored in the folder 600.

The folder 601 stores changing forms corresponding to noun words, e.g., singular possessive form and plural subjective forms. When the root word of a noun is ⌈name⌋, for example, all the changing forms ⌈des names, die namen⌋, etc. corresponding to ⌈name⌋ are stored in the folder 601.

The folder 602 stores changing forms corresponding to adjective words, e.g., comparative form and superlative forms. When the root word of an adjective is ⌈gut⌋, for example, all the changing forms ⌈gutter, gutten, gutem, gutes, gute, gutest⌋, etc. corresponding to ⌈gut⌋ are stored in the folder 602.

The folder 603 stores changing forms corresponding to pronoun words, e.g., changing forms of a pronoun when declined. When the root word of a pronoun is ⌈ich⌋, for example, all the changing form words ⌈meiner, mir, mich⌋, etc. corresponding to ⌈ich⌋ are stored in the folder 603.

As shown in FIG. 2, the RAM 7 has a memory area which temporarily stores various programs the CPU 4 executes, and data or so involved in the execution of the programs. In the embodiment, the RAM 7 particularly has a search-word memory area 70, a changing-form-search-word memory area 71a first example-sentence number memory area 72, a second example-sentence number memory area 73, a display-example-sentence number memory area 74, and a display-example-sentence memory area 76.

The search-word memory area 70 stores a plurality of words input through the input unit 30. Hereinafter, of the input words, each word is referred to as "search word", and a plurality of words are referred to as "plural search wording". When "search wording" is simply mentioned, it means a word(s) input by the user for a search, and may be a single word and a plurality of words (i.e., plural search wording).

The changing-form-search-word memory area 71 stores changing forms of a search word stored in the search-word memory area 70.

The first example-sentence number memory area 72, the second example-sentence number memory area 73, and the display-example-sentence number memory area 74 store example sentence identification information which is searched during execution of an example sentence search process (see FIG. 7) to be described later by the CPU 4.

The display-example-sentence memory area 76 stores an example sentence to be displayed on the display unit 20 by the CPU 4.

Figure 7:
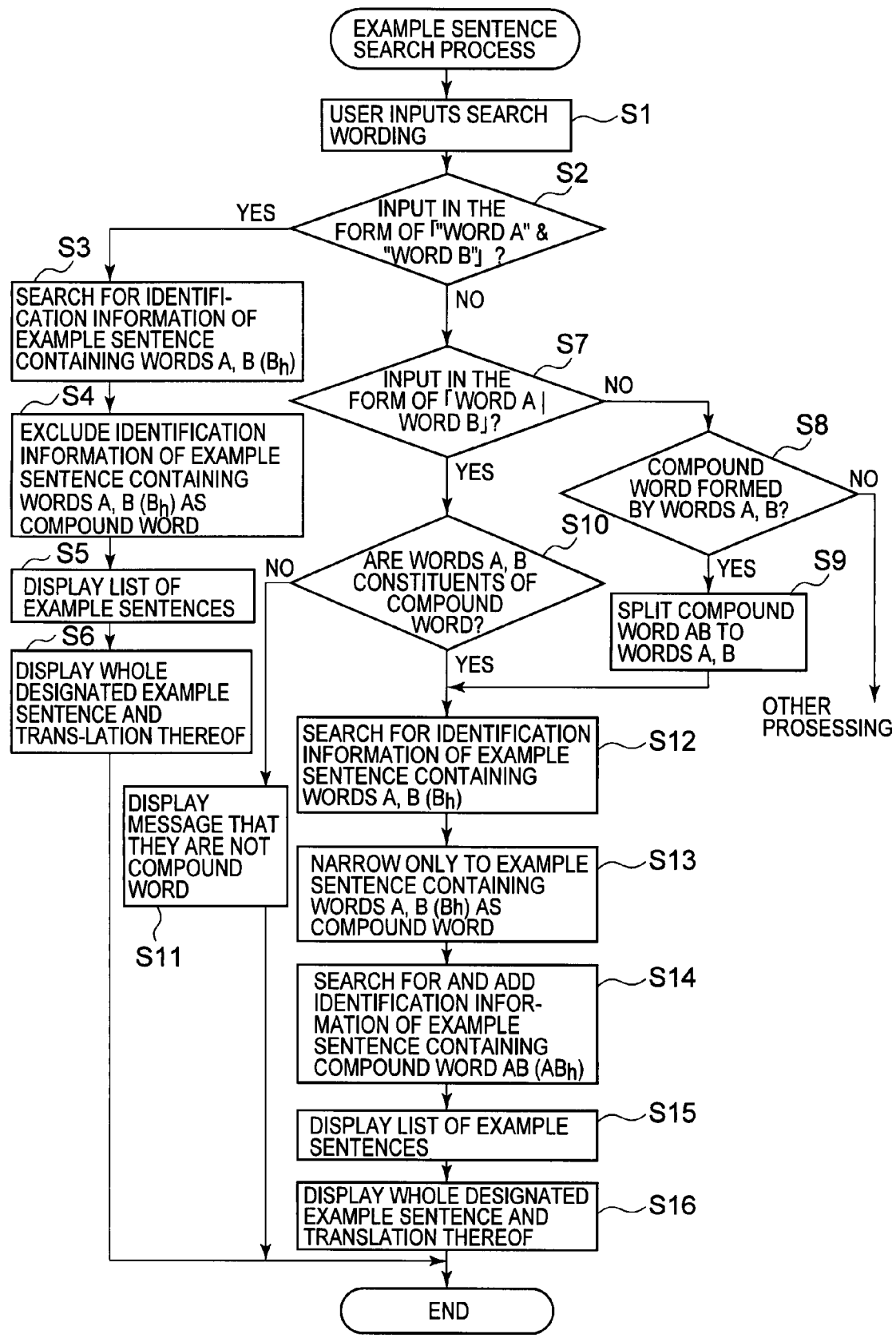
FIG. 7 is a flowchart illustrating an example sentence search process of the information display control apparatus according to the invention.

Next, the operation of the electronic dictionary 1 will be described referring to FIG. 7. FIG. 7 is a flowchart illustrating the operation of the example sentence search process in which the CPU 4 reads and executes the information display control program 51 from the flash ROM 5.

Figure 8:
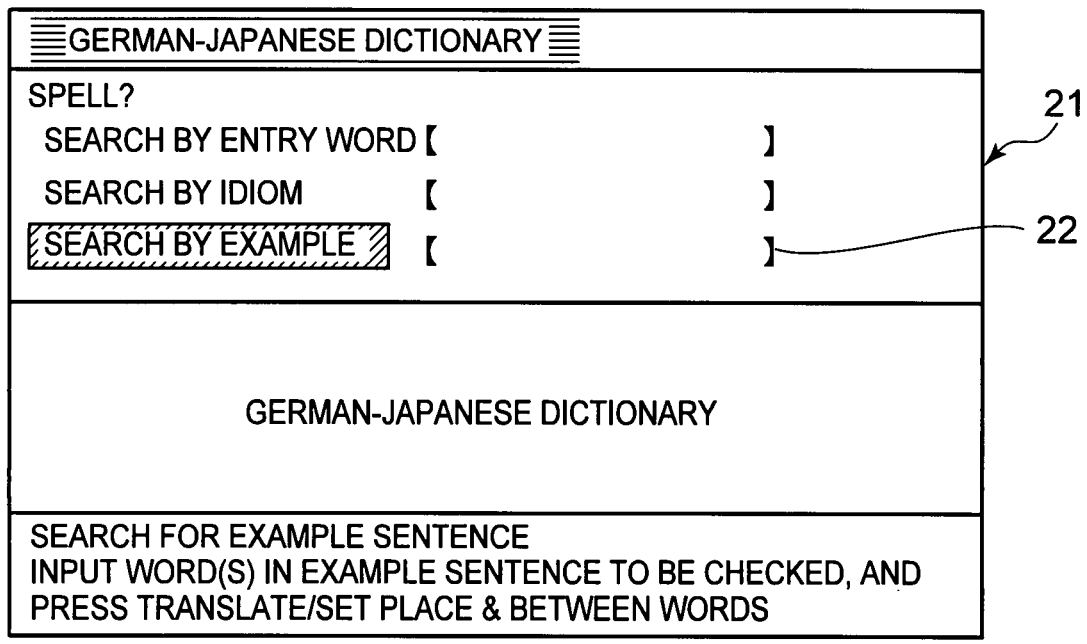
FIG. 8 is a diagram showing a search-word input screen.

First, the CPU 4 displays a search-wording input screen 21 as shown in FIG. 8 on the display unit 20. When the user performs an operation to input a search wording under the state (step S1), the CPU 4 displays characters in an input-character display area 22 of the search-wording input screen 21 based on depression signals of the depressed keys, and stores the input search wording in the search-word memory area 70. When the plural search wording is input as a search wording, individual search words are stored in the search-word memory area 70 in the input order.

When a word (X) and a word (Y) can form a compound word (XY), for example, the user can input the word (X), (Y) or the word (XY) as follows.

That is, in a case where the word (X) and the word (Y) are input for the purpose of searching for an example sentence which does not contain compound word (XY) but contains the words (X), (Y), the user inputs the words in a form of double-quoting the individual words with a quotation mark ⌈"⌋ and placing ⌈&⌋ between the words (hereinafter "compound-word excluding form") like ⌈word (X) & word (Y)⌋.

In a case where the word (X) and the word (Y) are input for the purpose of searching for an example sentence which contains the words (X), (Y), the user inputs the words in a form of placing ⌈&⌋ or space between the individual words without double-quoting the words with a quotation mark ⌈"⌋ (hereinafter "compound-word containing form" like ⌈word (X) & word (Y)⌋ or ⌈word (X) word (Y)⌋).

In a case where the word (X) and the word (Y) are input for the purpose of searching for an example sentence which contains the compound word (XY), the user inputs the words in a form of placing a split line ⌈|⌋ between the individual words or at each break position in the compound word (hereinafter "compound-word designated split form") like ⌈word (X)|word (Y)⌋.

In a case where the compound word (XY) is input for the purpose of searching for an example sentence which contains the compound word (XY), the user inputs the word in the original form (hereinafter "compound-word designated combined form") like ⌈word (XY)⌋.

Next, the CPU 4 determines whether or not a plurality of words (hereinafter words (A), (B)) as a search wording are input in the compound-word excluding form ⌈"word (A)" & "word (B)"⌋ (step S2). When having determined that the words are input in the compound-word excluding form (step S2: Yes), the CPU 4 searches for example sentence identification information of an example sentence containing the word (A) and the word (B), and example sentence identification information of an example sentence containing the word (A) and a word $(B_h)$ which is a changing form of the word (B) (step S3). The CPU 4 then stores the searched example sentence identification information in the display-example-sentence number memory area 74.

Specifically, first, the CPU 4 searches for example sentence identification information of an example sentence containing the words (A), (B) based on the word-example-sentence data table 60c. And the CPU 4 stores the example sentence identification information in the first example-sentence number memory area 72 and the second example-sentence number memory area 73. The CPU 4 also searches for a word $(B_h)$ of a changing form of the word (B) based on the changing-form-word data table 60d, and stores the word $(B_h)$ in the changing-form-search-word memory area 71. Thereafter, the CPU 4 searches for example sentence identification information of an example sentence containing the word $(B_h)$ based on the word-example-sentence data table 60c, and additionally stores the example sentence identification information in the second example-sentence number memory area 73. The CPU 4 then detects that example sentence identification information which is commonly stored in the first example-sentence number memory area 72 and the second example-sentence number memory area 73, and stores the example sentence identification information in the display-example-sentence number memory area 74.

Next, based on the example-sentence data table 60b, the CPU 4 detects example sentence identification information of an example sentence containing the word (A) and the word (B) as a compound word (A), (B) and example sentence identification information of an example sentence containing the word (A) and the word (B$_h$) as a compound word (A), (B$_h$). Thereafter, the CPU 4 excludes the detected example sentence identification information from the example sentence identification information in the display-example-sentence number memory area 74 (step S4).

Based on the example-sentence data table 60b, the CPU 4 detects an example sentence corresponding to the example sentence identification information in the display-example-sentence number memory area 74, and stores the example sentence in the display-example-sentence memory area 76. The CPU 4 then displays a list of example sentences in the display-example-sentence memory area 76 on the display 2 (step S5), displays the entire example sentence designated by the user and a translation thereof on the display 2 (step S6), then terminates the example sentence search process.

Figure 9:
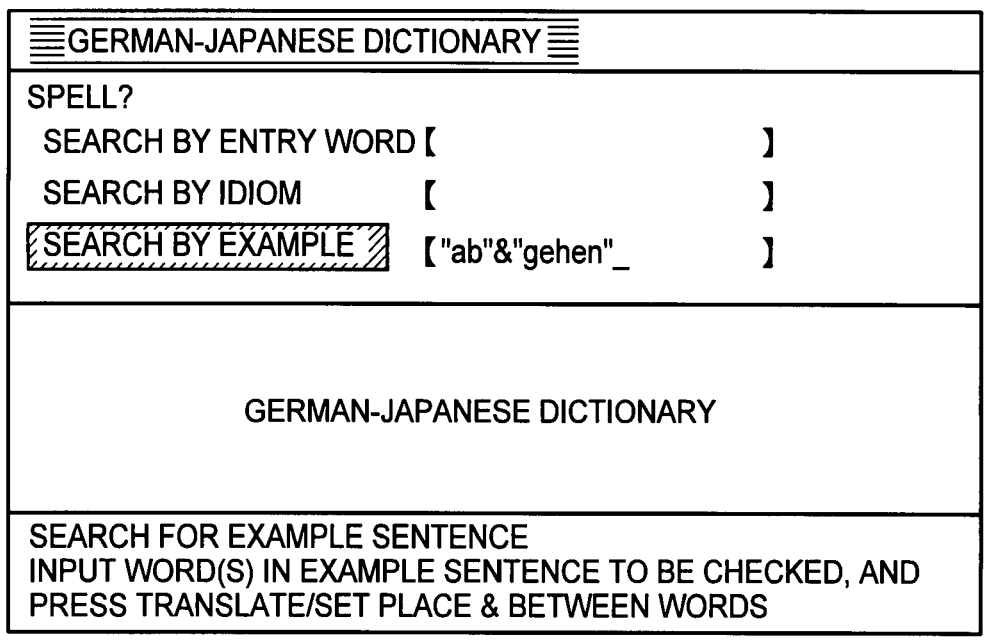
FIG. 9 is a diagram showing a state where a plurality of are input in a compound-word excluded form.

In a case where a plurality of words ⌈ab⌋, ⌈gehen⌋ which can form a split verb ⌈abgehen⌋ of a compound word are input in the compound-word excluding form [ "tab" & "gehen" ] in step S1 as shown in FIG. 9 (step S2: Yes), for example, example sentence identification information in the example sentence fields R2 and R3 are detected as example sentence identification information of an example sentence containing the word ⌈ab⌋ and the word ⌈gehen⌋ and example sentence identification information of an example sentence containing the word ⌈ab⌋ and the word ⌈geht⌋ as shown in FIG. 4 (step S3). Thereafter, example sentence identification information "123, 124, 137, 1250" of an example sentence containing the word ⌈ab⌋ and the word ⌈gehen⌋ (⌈geht⌋) as a compound word ⌈abgehen⌋, as shown in FIG. 4, is excluded (step S4). Then, as shown in FIG. 10, of example sentences containing the words ⌈ab⌋, ⌈gehen⌋, those example sentences where the words ⌈ab⌋, ⌈gehen⌋ are not used as a compound word ⌈abgehen⌋, i.e., example sentences corresponding to example sentence identification information "135", "136" as shown in FIG. 4 are displayed in the form of a list at an upper portion of the display 2. Further, the whole example sentence designated by highlighting and a translation thereof are displayed at a lower portion of the display 2.

When having determined in step S2 that a plurality of words (A), (B) are not input in the compound-word excluding form (step S2: No), the CPU 4 determines whether or not the words (A), (B) are input in the compound-word designated split ([ "word (A)|word (B)" ]) (step S7).

When having determined in step S7 that the words (A), (B) are not input in the compound-word designated split (step S7: No), the CPU 4 determines whether or not the compound word (AB) is input in the compound-word designated combined form ([ word (AB) ]) (step S8). When it is determined in step S8 that the compound word (AB) is not input in the compound-word designated combined form (step S8: No), i.e., when words which are not a compound word are input or when a plurality of words (A), (B) are input in the compound-word containing form ([ word (A) word (B)⌋ or ⌈word (A) & word (B)⌋), the CPU 4 goes to another process. When having determined in step S8 that the compound word (AB) is input in the compound-word designated combined form (step S8: Yes), the CPU 4 splits the compound word (AB) to the words (A), (B) from the top in order (step S9), and then goes to the process of step S12 to be described later. A scheme disclosed in Unexamined Japanese Patent Application KOKAI Publication No. 2004-206538 can be used as a scheme of splitting the compound word (AB) into the words (A), (B).

When having determined in step S7 that the words (A), (B) are input in the compound-word designated split (step S7: Yes), the CPU 4 determines whether or not the words (A), (B) are constituting words of a compound word based on the entry-word data table 60a (step S10). When the compound word (AB) is stored in the compound word field (see the right-hand field in FIG. 4) in the example-sentence data table 60b or when the words (A), (B) and the compound word (AB) are stored as entry words in the entry-word data table 60a, for example, the words (A), (B) are determined as the constituting words of the compound word (AB).

When having determined in step S10 that the words (A), (B) are not the constituting words of a compound word (step S10: No), the CPU 4 displays, on the display 2, an error message to the effect that the input words are not the constituting words of a compound word and an example sentence search is not executed to notify the user of the decision result (step S11). And the CPU 4 terminates the example sentence search process without searching example sentences.

When having determined in step S10 that the words (A), (B) are the constituting words of a compound word (step S10: Yes), the CPU 4 searches for example sentence identification information of an example sentence containing the word (A) and the word (B) and example sentence identification information of an example sentence containing the word (A) and the word (B$_h$) (step S12) as in the aforementioned step S3, and stores the searched example sentence identification information in the display-example-sentence number memory area 74.

Next, the CPU 4 detects example sentence identification information of an example sentence containing the word (A) and the word (B) as a compound word (AB) and example sentence identification information of an example sentence containing the word (A) and the word (B$_h$) as a compound word (AB$_h$) based on the example-sentence data table 60b. And the CPU 4 excludes other example sentence identification information than the detected example sentence identification information from the example sentence identification information in the display-example-sentence number memory area 74 (step S13).

The CPU 4 searches for example sentence identification information of an example sentence containing the compound word (AB) and example sentence identification information of an example sentence containing the compound word (AB$_h$), and additionally stores the searched example sentence identification information in the display-example-sentence number memory area 74 (step S14).

The CPU 4 displays a list of example sentences in the display-example-sentence memory area 76 on the display 2 (step S15), displays the whole example sentence designated by the user and a translation thereof on the display 2 (step S16), then terminates the example sentence search process.

In a case where the split verb ⌈abgehen⌋ of a compound word is input in the compound-word designated combined form (step S8: Yes) or the words ⌈ab⌋, ⌈gehen⌋ are input in the compound-word designated split (step S7: Yes) in step S1 as shown in FIGS. 11A and 11B, for example, example sentence identification information in the example sentence fields R2 and R3 are detected as example sentence identification information of an example sentence containing the word ⌈ab⌋ and the word ⌈gehen⌋ (step S12) as shown in FIG. 4. Thereafter, example sentence identification information "123, 124, 137, 1250" of an example sentence containing the word ⌈ab⌋ and the word ⌈gehen⌋ (⌈geht⌋) as the compound word ⌈abgehen⌋, as shown in FIG. 4, is excluded from the detected example sentence identification information (step S13). Then, example sentence identification information in the example sentence fields R1, R4 are detected as example sentence identification information of an example sentence containing the compound word ⌈abgehen⌋ or ⌈abgegangen⌋ in a combined state (step S14). Thereafter, as shown in FIG. 12, of example sentences containing the words [ab], [gehen], those example sentences where the words [ab], [gehen] are used as the compound word [abgehen], i.e., example sentences corresponding to example sentence identification information "1255", "1256" and the like, or example sentences where the words [ab], [gehen] are used as the compound word [abgegangen], i.e., example sentences corresponding to example sentence identification information "1271" or the like are displayed in the form of a list at an upper portion of the display 2. Further, the whole example sentence designated by highlighting and a translation thereof are displayed at a lower portion of the display 2.

According to the electronic dictionary 1 described above, when a compound word formed by a plurality of combinable and splittable constituting words is input, an example sentence containing a compound word in a combined state and an example sentence containing a compound word in a split state are searched for, regardless of a case where the compound word in the combined state is input or a case where the compound word in the split state is input. Unlike the conventional technique, therefore, the invention can search for adequate example sentences.

Even when a compound word input has constituting words in the root form, example sentences each containing a compound word having constituting words in the changing form are searched. Even when a compound word input has constituting words in the changing form, example sentences each containing a compound word having constituting words in the root form are searched. It is therefore possible to execute more adequate example sentence search.

When a plurality of words are input in the compound-word designated split form and the words are not determined as the constituting words of a compound word, example sentences are not searched. When a plurality of words which do not form a compound word are input as a compound word, therefore, it is possible to prevent wrong example sentences from being searched out. This makes it possible to execute more adequate example sentence search. When example sentences are not searched for, a display to that effect is presented, so that the user can be notified that a plurality of words which does not form a compound word are input as a compound word.

When a plurality of words are input in the compound-word excluding form, of the example sentences containing all the words, those example sentences which do not contain a compound word which is formed by the words are searched for. Even when example sentences which contain a plurality of words not as a compound word are searched for, therefore, it is possible to execute more adequate example sentence search.

Although the foregoing description of the embodiment has been given of the information display control apparatus according to the invention being adapted to the electronic dictionary 1, the application of the invention is not limited to such a product, but the invention can be adapted to general electronic devices, such as a cellular phone, a personal computer and an electronic clock. The information display control program 51 according to the invention may be stored in a memory card, CD or the like which is detachable/attachable to/from the main body of the electronic dictionary.

Although the foregoing description has been given of the case where a compound word is formed by two words, a compound word may be formed by three or more words.

While a compound word has been explained as a split verb, it may be other parts of speech such as a compound noun.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-85522 filed on Mar. 27, 2006 and including specification, claims, drawings and summary. The disclosure of the above Japanese Patent Application is incorporated herein by reference in its entirety.

What is claimed is:

1. An information display control apparatus comprising:
an example sentence storage unit which stores a plurality of example sentences;
an input unit which accepts a user's operation of inputting a string of characters;
a split form of split verb distinguishing unit which distinguishes whether or not a plurality of words is input in split form of a split verb via the input unit;
a split verb example sentence search unit which, when the input plurality of words is distinguished to be in split form of a split verb by the split form of split verb distinguishing unit, searches the example sentences in the example sentence storage unit for an example sentence containing the plurality of words in combined form of the split verb and an example sentence containing the plurality of words in split form of the split verb; and
a split verb example sentence display control unit which displays the example sentences searched by the split verb example sentence search unit.

2. The information display control apparatus according to claim 1, further comprising:
a symbol-inserted plural words distinguishing unit which distinguishes whether or not a plurality of words with an ampersand symbol as a word separator is input via the input unit;
a plural words example sentence search unit that, when the input plurality of words is distinguished into words with an ampersand symbol as a word separator by the symbol-inserted plural words distinguishing unit, searches for an example sentence containing the plurality of words; and
a plural words example sentence display control unit that displays the example sentences searched by the plural words example sentence search unit.

3. The information display control apparatus according to claim 1, further comprising:
an example sentence search unit which, when a compound word consisting of a plurality of constituting words which are combinable and splittable is input via the input unit, searches the example sentences in the example sentence storage unit for an example sentence containing the compound word in a combined state where the plurality of constituting words are combined and an example sentence containing the compound word in a split state where the plurality of constituting words are split; and
a display control unit which displays the example sentences searched by the example sentence search unit.

4. The information display control apparatus according to claim 3, further comprising a constituting word converting unit which, when a compound word is input via the input unit, converts at least one constituting word into a changing form word in the compound word, and wherein the example sentence search unit searches for an example sentence containing a compound word in a combined state which has the changing form word and an example sentence containing a compound word in a split state which has the changing form word.

5. A non-transitory computer readable recording medium having a program stored thereon that controls a computer to perform functions comprising:

storing a plurality of example sentences;

accepting a user's operation of inputting a string of characters;

distinguishing whether or not a plurality of words is input in split form of a split verb;

when the input plurality of words is distinguished to be in split form of a split verb, searching the example sentences stored by the example sentence storage function for an example sentence containing the plurality of words in combined form of the split verb and an example sentence containing the plurality of words in split form of the split verb; and displaying the searched example sentences.

* * * * *